United States Patent
Bergstrom (12)
(10) Patent No.: US 6,249,418 B1
(45) Date of Patent: Jun. 19, 2001

(54) SYSTEM FOR CONTROL OF AN ELECTROMAGNETIC ACTUATOR

(76) Inventor: Gary Bergstrom, 191 Miles Rd., Moreland Hills, OH (US) 44022

(*) Notice: Subject to any disclaimer, the term of this patent is extended or adjusted under 35 U.S.C. 154(b) by 0 days.

(21) Appl. No.: 09/238,344

(22) Filed: Jan. 27, 1999

(51) Int. Cl.$^7$ .................................................. H01H 47/00
(52) U.S. Cl. ................................................................ 361/152
(58) Field of Search ........................................ 361/139, 143, 361/144, 146, 152, 153, 159, 160, 170, 171, 178, 154; 123/490, 494, 90.11; 307/86, 87, 101, 143, 145, 142

(56) References Cited

U.S. PATENT DOCUMENTS

| | | | |
|---|---|---|---|
| 3,671,814 | 6/1972 | Heinrich | 361/152 |
| 3,697,840 | * 10/1972 | Koch | 361/154 |
| 4,368,501 | 1/1983 | Gingrich | 361/152 |
| 4,434,450 | 2/1984 | Gareis | 361/152 |
| 4,450,427 | 5/1984 | Gareis | 324/251 |
| 4,608,620 | 8/1986 | Hines | 361/154 |
| 4,656,400 | * 4/1987 | Pailthorp et al. | 361/154 |
| 4,659,969 | 4/1987 | Stupak | 361/154 |
| 4,665,348 | 5/1987 | Stupak | 361/154 |
| 5,406,440 | 4/1995 | Wieloch | 361/154 |
| 5,442,515 | 8/1995 | Wallaert | 361/187 |
| 5,467,244 | * 11/1995 | Jayawant et al. | 361/144 |
| 5,546,268 | * 8/1996 | Hurley et al. | 361/154 |
| 5,635,784 | 6/1997 | Seale | 128/662.06 |
| 5,933,313 | * 8/1999 | Furukawa | 361/154 |

* cited by examiner

*Primary Examiner*—Ronald W. Leja
(74) *Attorney, Agent, or Firm*—Pierce Atwood; Chris A. Caseiro (57) ABSTRACT

A system for controlling the force and/or motion of an electromagnetic actuator. The actuator could be a solenoid, relay, or levitating device. The drive to the coil can be linear or switching, voltage or current and the sensors measuring the system can be as simple as just a current sensor monitoring the coil current or a flux sensor. Continuous control of position can be achieved allowing magnetic levitation or the soft landing of the moving element.

22 Claims, 7 Drawing Sheets

SYSTEM FOR CONTROL OF AN ELECTROMAGNETIC ACTUATOR

BACKGROUND OF THE INVENTION

1. Field of the Invention

This invention relates to the control of a large class of moving element systems described as electromagnetic actuators such as solenoids, contactors, or even trains.

2. Description of the Prior Art

Electromagnetic actuators including the solenoid are also called variable reluctance actuators. In these devices we find a movable element made of either a ferromagnetic material, a magnet, or both, that has a force exerted on it by a magnetic field which has been generated by an electrical current flowing in a coil of wire. There may also be a permanent magnet in the non-moving component, and the coil then either adds to or reduces the force produced by the magnet. The coil is also typically wound on a ferromagnetic material to increase the efficiency and force.

Common examples of such items are tubular solenoids, the individual wires in many printheads, cradle relays, some types of Maglev trains, and novelty items such as globes that magnetically float without direct mechanical contact above or below their support. Loudspeakers are included in the list of systems that can be controlled with this approach. Although the motion of a loudspeaker coil is not normally controlled with a closed loop system, it is possible to do.

Although many such systems are presently controlled by feedback systems, smooth control of the motion and position of the moving element in these systems has always been a somewhat complicated combination of hardware, both mechanical and electrical. The complication arises due to the nature of the problem that these systems are trying to control. The forces controlling the closure of all of these systems are usually very non-linear. As the air gap between the magnetic materials contained in these systems decreases, the force exerted by a constant current in the coil increases. In most on/off systems of this type the result is runaway motion, with the moving element accelerating until it runs into a stop. The resultant impact can create significant noise, vibration and wear.

Many previous approaches have been tried with varying degrees of success and complexity. One example is shown by Jayawant U.S. Pat. No. 5,467,244 wherein a system is built that not only allows control of the runaway; it allows the system to control the position of the object. Other systems, such as Stupak U.S. Pat. No. 4,659,969, have also succeeded at some measure of control, with Stupak adding a Hall sensor to the system in order to monitor the magnetic flux contained in the system. An even earlier system, Gingrich U.S. Pat. No. 4,368,501 shows us how to derive the flux signal from a second winding on the device. Other systems have attempted feedback control with a variety of position sensors looking at the moving element. Seale U.S. Pat. No. 5,635,784 describes another approach to such control.

The sensing technique used is of great importance in many systems. Often the device is located in an environment that is hostile to certain types of sensors. Hall effect sensors, for example, are semiconductor integrated circuits that have a limited temperature range. The addition of extra coils to perform the sensing can have an impact on the physical size, not to mention the complexity of the additional wires. Jayawant describes a system that uses just the two wires of the existing coil, but surrounds that coil with a complicated electronic circuit to extract the signals needed for control.

What has not been realized in these previous systems is that the system they are trying to control has been overdetermined. More information is available than is needed to adequately control the motion of the moving element. Systems have attempted to drive a coil with a known signal, while at the same time measuring two parameters in the driven system. Typically the coil is driven with a voltage, and the current and the flux in the coil are measured. As noted above there are a variety of techniques used to measure both the current and the flux.

Jayawant describes measuring the inductance rather than flux in order to have two independent measurements of the system, which he felt, was necessary to compute the position of the moving element.

SUMMARY OF THE INVENTION

The present invention provides for the control of the position of, or force on an electromagnetic actuator using the minimum possible amount of information from the system. In a typical example of FIG. 1, this is a system driving a coil with a voltage (a duty cycle or pulse width modulated (PWM) driven system) and measuring just the current that flows through the coil. But that is not the only possible configuration. There are a number of physical parameters that can be either known or measured: voltage across the coil, current through the coil, magnetic flux in the coil, and inductance of the coil. A number of different combinations of these can be combined to calculate the position of the moving element or the magnetic force that is applied to it. Traditionally the current through or voltage across the coil, along with the flux, has been used to calculate the position. What will be shown here is that by knowing the drive to the coil (either voltage or current) and then measuring only one of the other parameters (voltage, current, or flux), it is possible to calculate the position. This minimizes the hardware required, and in some systems the actuator can be reduced to just the coil itself. Alternatively, magnetic flux, and therefore force instead of position, can be controlled.

Figure 7:
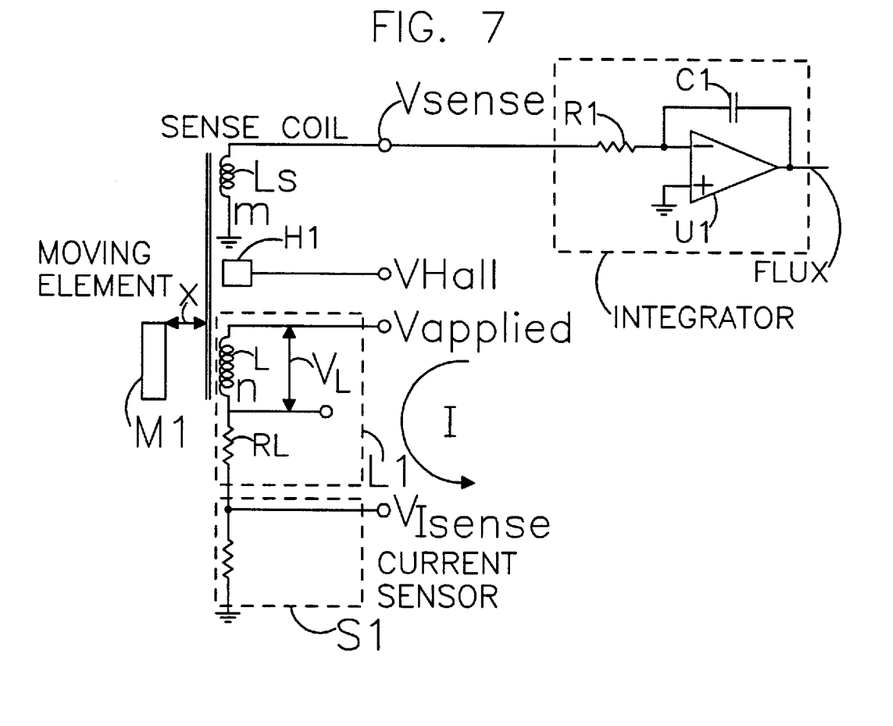
FIG. 7 shows the device under control in more detail. The moving element M1 is shown at a distance x from the stationary coil L1. The optional Hall H1 sensor is shown, as is the optional sense winding Ls. The sense winding may also have an integrator (U1+R1+C1) following it to compute the flux (the integral of Vs). This integration may be done in the controller, so this is an optional component.

First the background equations concerning the system to be controlled need to be developed. Referring to FIG. 7, we see a system composed of:

a coil L1
a moving element M1
a Hall effect sensor H1
a sense coil Ls
a current sensor S1

(Not all of these elements will be present in all systems.)
A detailed description of the above follows:

L1—this coil is composed of a number of optional elements. It is first broken electrically down into two components: an ideal inductance L in series with the dc resistance of coil RL. The coil can then be either an air core, wound on a permanent magnet, or more commonly wound on a ferromagnetic material (e.g. soft iron) to enhance its effect. Some systems might even include both the ferromagnetic material and permanent magnet. The coil is composed of n turns of wire.

M1—the moving element can also be composed of a number of different kinds of material. Both a ferromagnetic material and/or a permanent magnet can be used as the active moving component. Other materials can be present, and will move along with the active material, but they will not contribute to the motion other than to add mass to the moving element. The relative motion between M1 and L1 is considered to be x, the motion of M1. We choose the coil L1 to be the stationary element just for a frame of reference for this discussion. In practice either component or both may move with respect to the observer.

H1—an optional Hall effect sensor mounted in a location that allows it to measure the magnetic flux in the gap and output a voltage proportional to the flux.

Ls—an optional sense coil wound with m turns of wire so that it is coupled to coil L1. This coil needs to be wound closely enough to L1 so that the flux passing through it is either substantially the same as the flux passing through L1 or proportional to the flux.

S1—an optional current sensor used to detect the current flowing through the coil L1. This would commonly be a small valued resistor. A small value is usually used to reduce the voltage drop, and therefore power dissipated, in the resistor. In a typical system an amplifier is often needed to raise the small voltage generated by this small valued resistor to a level convenient for the rest of the system.

Equations relating these items to each other can now be written:

The voltage $V_L$ across the ideal inductor L in a typical system (as in FIG. 7) is:

$$V_L = V_{applied} - I*RL - V_{sense} \qquad \text{Equation 1}$$

This simply states that the voltage across the ideal inductance is just the applied voltage minus the drops across all the resistances due to the current that is flowing. If a pulse width modulation (PWM) drive is used, then this voltage is the average applied voltage. Some work to calculate the average applied voltage in a PWM system may be needed, since the voltages applied during the on and off times will probably differ, as may the resistances of the circuit elements that impart these on and off voltages.

$$V_{sense} = V_L * (m/n) \qquad \text{Equation 2}$$

The sense coil voltage is equal to the voltage $V_L$ across the ideal inductance L times the turns ratio between the two coils.

$$V_{Hall} = k1 * \Phi$$

The Hall effect device's output voltage $V_{Hall}$ is proportional to the flux $\Phi$ in the gap between the coil and the moving element M1. The constant k1 is either known ahead of time given the geometry and specification of the components, or it can be measured when the device is constructed.

To extract the flux information using a sense coil (Ls) we need to understand what occurs when we apply a voltage to a coil and how that affects magnetic flux. A real world coil can be modeled at low frequencies by an ideal inductance L and an ideal resistance RL. The voltage across the ideal inductance $V_L$ is given by:

$$V_L = n * \frac{d\Phi}{dt} \qquad \text{Equation 3}$$

where n is the number of turns and ($\Phi$) is magnetic flux. This simply states that the voltage across a coil is equal to the number of turns times the change in flux with respect to time.

Integrating the change in flux will give us flux (plus a constant):

$$\Phi + k2 = \int \frac{d\Phi}{dt} dt = \int \frac{V_L}{n} dt \qquad \text{Equation 4}$$

For moving magnet systems we need to note that:

$$\frac{d\Phi}{dt} = \frac{d\Phi}{dx} * \frac{dx}{dt} \qquad \text{Equation 5}$$

The first term on the right in equation 5, the change in flux with a change of position x, is a function of the geometry of the system and can be computed or measured ahead of time. It may be a strong function of x. For example the change of flux with respect to distance of a spherically shaped magnet goes as the reciprocal of the distance x cubed. Differentiating that yields an inverse fourth order equation. But as noted, this can be figured out ahead of time. The equation will have to be solved continuously during operation, but the form will be known.

Finally we come to x, the measure of the distance. For some systems x will approximately equal zero when the gap closes. In other systems it may be easier for the mathematics to have x equal zero when the moving element M1 is centered at the coil even though this may be physically impossible, since both the moving element and the coil may not both fit at one location at the same time.

We define a quantity x' as:

$$x' = k3 * \frac{I}{\Phi} \qquad \text{Equation 6}$$

For a solenoid with relatively large flat faces the quantity x' can be a very good approximation to the actual physical gap x between the moving element M1 and a core of ferromagnetic material that the coil is wound around, especially if the gap is small compared to the size of the flat faces. Other combinations of geometries and materials will be discussed later, but for now we will write that x is approximately equal to x':

$$x \approx x' = k3 * \frac{I}{\Phi} \qquad \text{Equation 7}$$

We also consider a more complicated form:

$$x = f(x') \qquad \text{Equation 8}$$

allowing for the more difficult case where either the geometry is such that equation 7 is not a good fit, or for applications that demand a better solution than can be had with the simple equation 7.

There is one more item that needs to be clarified. The coefficient k3 in equations 6 & 7 varies in proportion to the product n*A, where n is the number of turns and A is the cross sectional area of the flux gap. In all of the discussion it has been assumed that the current (I) flowing through the transducer times the number of turns of wire on the transducer is the same as the ampere-turns (the actual physical driving force or magnetomotive force) that drives the flux. This is an approximation, since eddy currents in the core materials (if present), will cause k3 in equations 6 & 7 to vary. Not only is the error in most systems slight, it is only significant when the current is rapidly changing. If the driven system requires a great deal of rapid changes of current, contains very lossy materials, or requires extreme precision, then this effect would have to be incorporated in the equations.

DETAILED DESCRIPTION OF THE PREFERRED EMBODIMENT OF THE INVENTION

Figure 1:
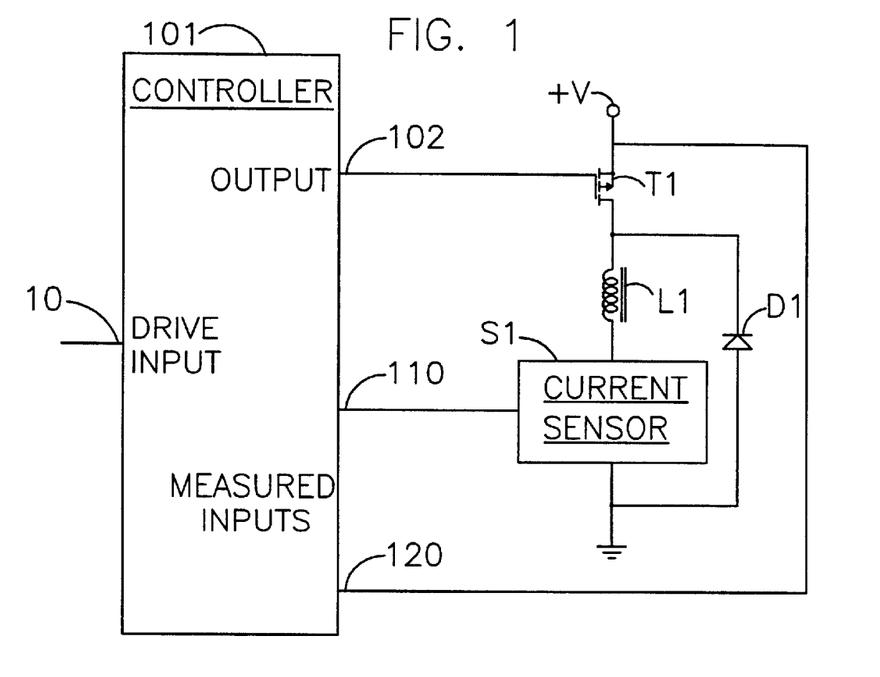
FIG. 1 shows an implementation of the invention for a pulse width modulated (PWM) version. The pass transistor T1 is either switched on or switched off by the controller 101. L1 is the device to be controlled. The current sensor could be a current sense resistor (typically of low-valued ohms to minimize the voltage drop) with an amplifier raising the signal to the level that the controller requires. Other current sensors (e.g. Hall effect, etc.) could be used just as well. D1 is a diode that conducts during the off time of switch T1 when current is flowing in L1. Signal line 120 allows the controller to monitor the supply voltage (+V) if desired. Drive input 10 is the external target the controller is attempting to follow.

Referring to FIG. 1, we see a typical embodiment of the invention. Switch T1 applies power to the device from the supply +V. A controller 101 is looking at the average current 110 through the current sensor S1. By computing VL, integrating this to get flux, and using the current sense information, the controller sets its output 102 to control the switch T1. This could be done by pulse width modulation (PWM), class D amplification, or other such methods that convert a value into a switched output. Of course the polarity of the supply could be minus rather than plus, and the switch could be any one of the many switches available that could handle the voltage, current, power, and speed. The controller could be a digital system (e.g. a microprocessor, microcomputer, gate array, etc.) driving a digital to analog (DAC) converter or timed PWM circuit for its output and using an analog to digital (A/D) converter on its input(s), or it might be an analog circuit doing everything with analog multipliers, dividers, and amplifiers.

Figure 5:
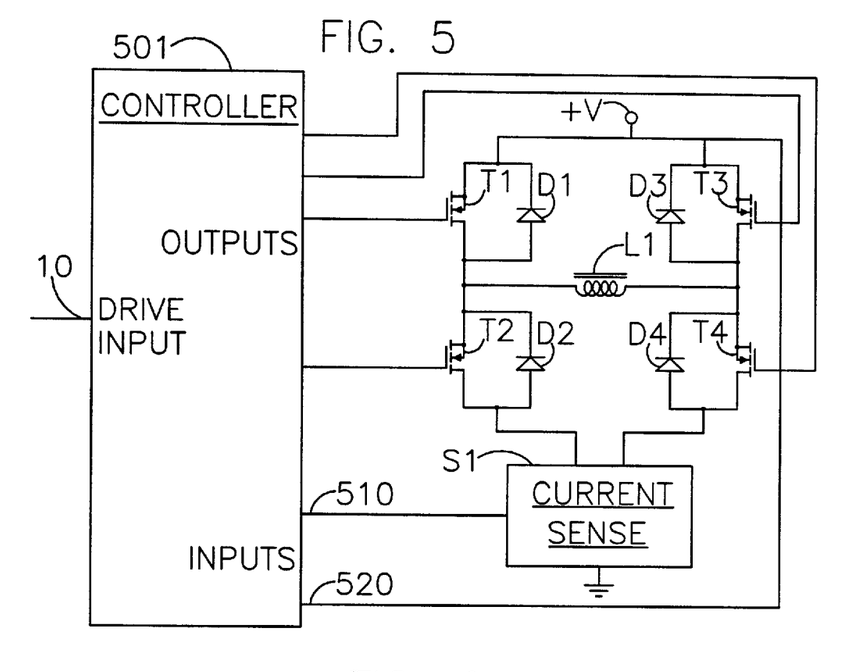
FIG. 5 show a full bridge implemented as switching devices. It also shows a current sense circuit S1 that must look at two currents and sum them, with appropriate signs, into a single current sense signal 510 that is sent back to the controller 501. The switches T1–T4 are not special, and they could be bipolar transistors, FETs, etc. They just need to be able to handle the required power at the required switching speed. Signal line 520 allows the controller to monitor the supply +V.

The diode D1 has the task of allowing the current in the inductor L1 to continue to flow after the switch has been turned off. This could be something as simple as a single silicon diode. It also could be more complicated depending upon the application. In some applications, the rapid decay of the current in L1 could be required, and a simple diode will not accomplish that. In order to dissipate the energy contained in the current that is flowing through the inductor there must be a place for it to go. The simple diode solution recirculates the current through the coil with the loss mechanism being the forward drop of the diode (this times the current gives power) plus the $I^2R$ (again power) loss in the resistance around the loop. If instead the user closes this circuit path with a larger voltage drop, then the energy in the coil will be dissipated faster. Historically a number of things have been used here: resistors, capacitors, zeners, or combinations of these switched in and out as appropriate. Dissipating this energy trades off the loss of the energy, and therefore system efficiency, for tighter control of the current in the coil. Tighter control here refers to the ability to control the decay of current with similar capability as the rise of current. If the circuit uses a full bridge (as shown in FIG. 5), or the simplified version of that using only two transistors and diodes commonly called the two transistor forward converter (FIG. 6), then energy can be recycled back to the power supply and both high efficiency and tight control can be achieved. This removal of energy from the current flowing through the transducer and returning it to the supply is called regenerative braking. If the moving element (M1) is driven by the external system, then energy from that motion can also be transferred to the power supply.

Figure 3:
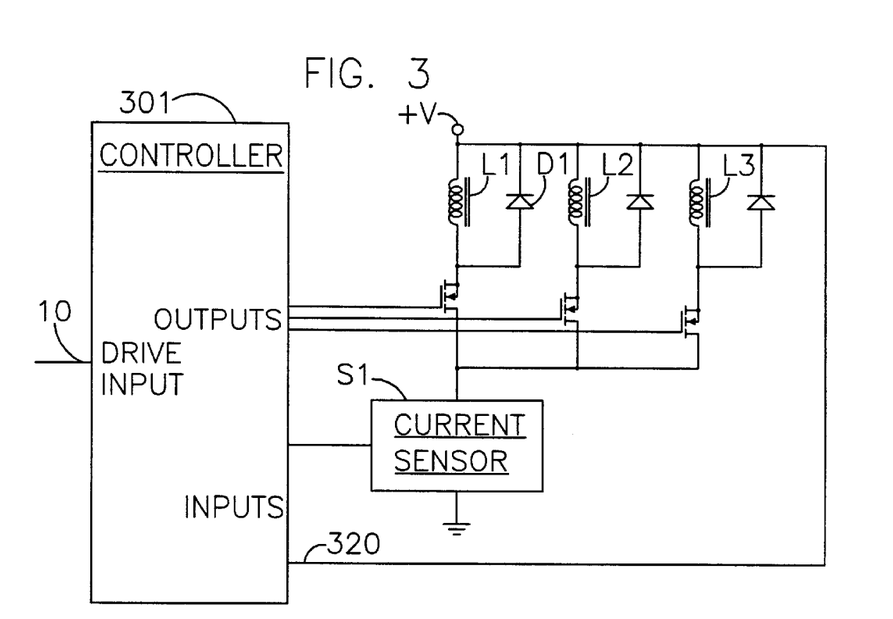
FIG. 3 shows an implementation that has three devices to control (L1, L2, L3). These three devices all share the same current sensor S1. For a simple controller 301 only one device at a time could be switched on. A complicated controller could try and sort out an individual device's current from the total current, when more than one device at a time is switched on. This topology need not stop with only 3 devices. Almost any number could be put in parallel in this fashion. The advantage of this system is a reduction in the number of current sensors required.

The controller 101 could be a sampled data system, and if it were sampled synchronously with the on switching of the switch T1 then the circuit could be configured slightly differently: the diode could connect directly across the coil. This is because the current sampling would only see the current during the period of time that T1 was on and not see current during the off time of T1 (the on time of the diode D1). That type of sampling makes the circuit of FIG. 3 easier to control. If current is sampled when only one of the transistors is on, then the current for that coil is known. If the circuit of FIG. 3 must be sampled asynchronously with the individual switches, then additional hardware will probably be needed to save the voltage generated when each switch is on. The controller at a different rate could then sample those voltages.

Figure 2:
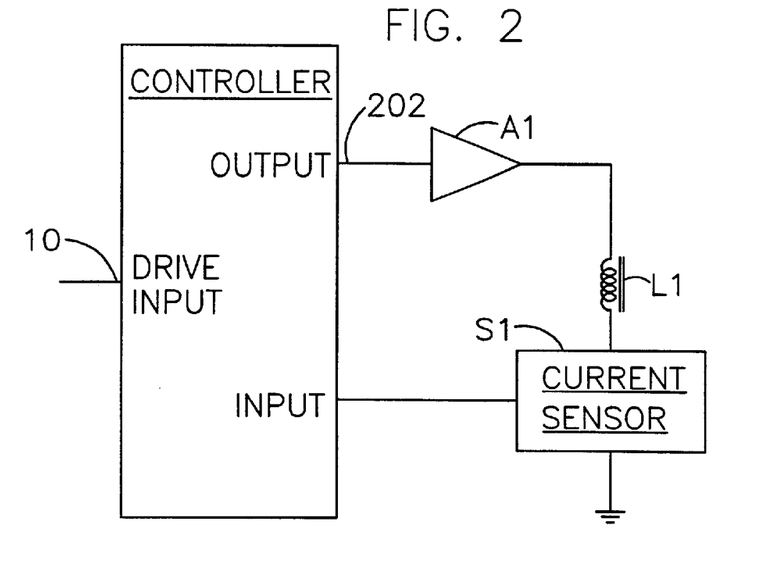
FIG. 2 shows a linear amplifier version of the circuit. Diode D1 from FIG. 1 is not needed since there is no time that the amplifier A1 is not in control of the currents and voltages flowing through the device.

FIG. 2 is, of course, the simplest looking circuit. However, it suffers from low efficiency of the amplifier unless the amplifier is a switching amplifier. The advantage of an amplifier is tighter control of the voltage and current in the coil. As noted above, the diode D1 that allows conduction of current during the off time of the switch T1 in FIG. 1 does not allow tight control since the full supply is applied in one direction but only a diode drop is applied in the reverse direction. The amplifier in FIG. 2 can be configured to allow both large positive and negative voltage swings resulting in the capability of both a rapid increase and a rapid decrease of the current in the coil. In a closed loop controller, being able to reduce the current rapidly can be as important as being able to increase the current rapidly. To keep efficiency high and achieve tight control the user could use a switching amplifier for A1 in FIG. 2.

Figure 4:
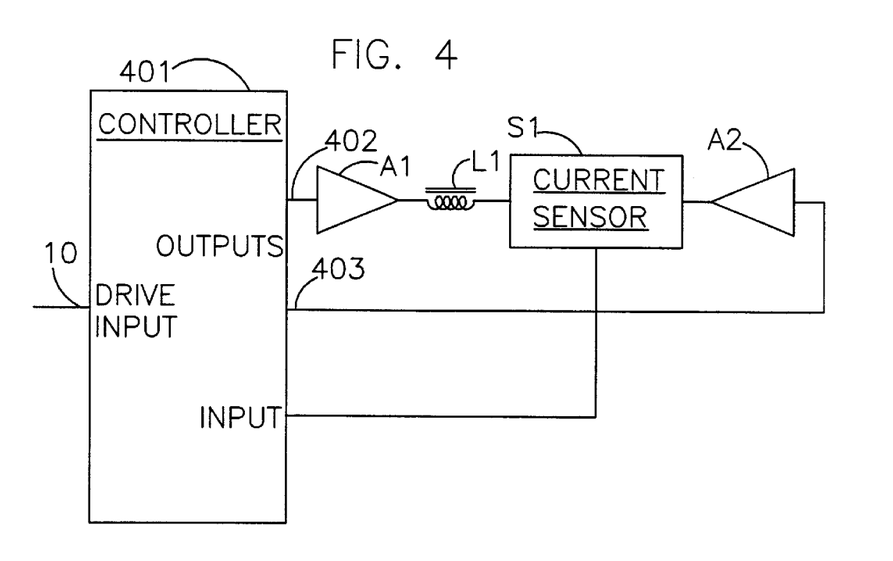
FIG. 4 shows a full bridge implementation that drives both sides of the coil L1 with active circuits (A1 & A2). These circuits (A1 & A2) could be either linear or switching. The controller 401 needs to generate complementary signals (402 & 403) to drive the two amplifiers.

FIG. 4 takes this approach a little further by driving the coil L1 with what is called a bridge amplifier. Both sides of the coil are actively driven with signals 402 and 403 from the controller 401. Typically, signal 403 is just the complement of signal 402 around some common bias voltage. This additional amplifier A2 allows operation on a single supply, since the bias point can now be away from ground, so long as both amplifiers operate around the same bias point. A1 and A2 could be either linear or switching. A disadvantage to this circuit is that the current sensor S1 becomes somewhat more complex. Either a sensor and signal conditioner needs to be inserted in the signal path as shown, or two current sensors, one in each amplifier, need to be implemented. If two sensors are implemented then either their outputs need to be combined before being sent to the controller, or the controller needs to combine the outputs inside itself. In either case, the combined current sense signal needs to be equal to the overall current flowing in L1.

FIG. 5 shows a typical switched PWM version of FIG. 4. Although this appears to be much more circuitry than FIG. 1 it contains a number of advantages. Since voltage can be applied in either direction, to the limit of the supply minus component drops, the controller has symmetric control of both the rise and fall of current through the coil. This is the same as in FIGS. 2 and 4. It is common to find such "full bridge" circuits available in a single integrated circuit (IC), or even two such circuits in a single IC. Finally, this circuit can solve a problem that occurs in many common relay and solenoid circuits in use today. Usually a relay or solenoid can be energized in one direction only, meaning the current flows only one way creating a magnetic field that pulls the moving part of the device. After many cycles of this, a residual magnetism can build up that can cause sticking of the moving part. In other words, the parts have taken on some permanent magnetization that causes them to hold together when they should come apart. Since magnetic fields can only pull on the moving part, it makes no difference which direction the current flows and so it would be possible to periodically alternate the direction of current flow using the circuit in FIG. 5. Alternating the direction of current would alternate the direction of the magnetic field hence decreasing the likelihood of buildup of a permanent field.

Figure 6:
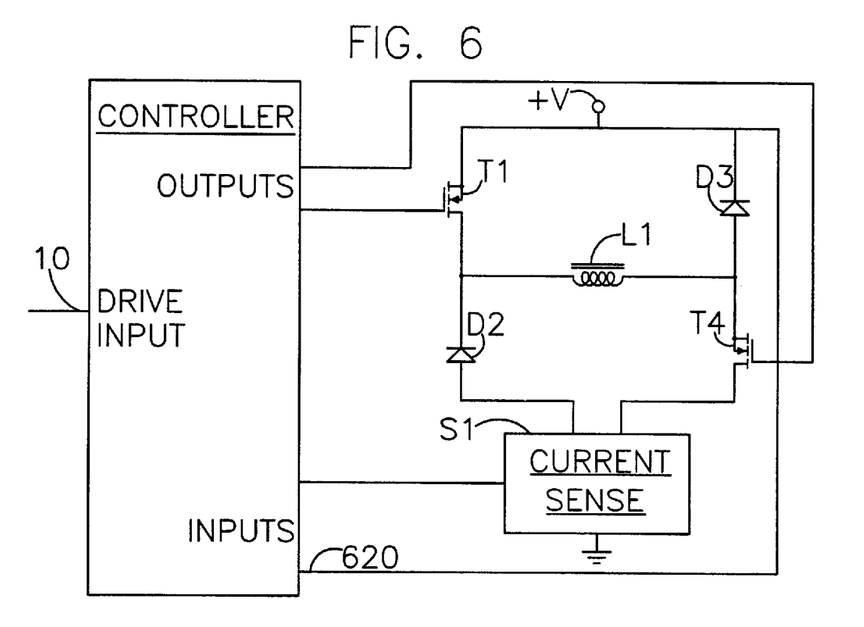
FIG. 6 shows the reduced version of the full bridge of FIG. 5, sometimes called a two transistor forward converter.

It should be noted that for applications that only need the tight control (equal control of both rise and fall) of current, and do not require the reversal of the current direction, a number of the components of FIG. 5 could be removed, at the slight cost of circuit efficiency. D1, T2, T3, and D4 could be removed, essentially reducing the circuit to a two transistor forward converter that is in common usage in switching power supplies (FIG. 6). The full bridge is more efficient since the forward converter has diodes conducting on one half cycle, while the full bridge always conducts with transistors, which can have lower forward drop and therefore higher efficiency. Also, note that with the bridge topology we do not waste any energy in achieving the tight control of current rise and fall. Above we noted that the addition of power dissipating components in the recirculating current path could allow the more rapid decay of current. FIGS. 5 & 6 return this current to the power supply, keeping efficiency high. Normal operation of the bridge (FIG. 5) is to turn diagonally opposite transistors on at the same time, alternating between one pair and the other. Additionally, a small dead time is often inserted between the transitions to keep currents from flowing from the supply straight to ground for the FIG. 5 circuit.

The voltage appearing across the inductive actuator load, L1, in FIG. 5, normally swings through a full polarity reversal, from roughly the supply voltage +V in one direction to roughly the same voltage in the opposite direction. When the average applied voltage goes to zero, the AC voltage component is nearly at a maximum. This large AC voltage can cause losses due to winding capacitance and due to eddy currents induced in the core. To reduce AC switching losses, the full wave bridge of FIG. 5 can be operated in four states for current flow in a given direction, e.g., from left to right. Conduction in both T1 and T4 drives the current forward. Conduction in both T2 and T3 slows left-to-right current flow rapidly while converting magnetic energy back into power supply energy (regenerative braking). Conduction in both T1 and T3 provides a "coasting" mode with braking primarily from coil resistance. This path could also be done with T1 and D3, but the use of T3 offers better efficiency if the drop across T3 is less than that of D3. Conduction in both T2 and T4 is an alternate "coasting" mode. (Again one transistor T4 could be used with one diode D2.) Both of these coasting modes need to factored into whatever current sense circuit is used so that the controller 501 receives an accurate signal 510 representing the true current flowing in L1.

An example of a simple modification to allow correct current sensing could be connecting the anode of D2 to ground rather than to the current sense circuit. Driving the bridge using all four transistors would inhibit conduction in D2 (current would rather flow in T2 when it is on than through D2). This would give proper results when not "coasting". By using the second "coasting" mode above (T2 & T4) and not turning on T2, current would conduct through D2 to ground. This could simplify the current sense circuit, with only minimal loss of efficiency.

In all of these circuits, the controller may need to monitor the supply voltage +V. The signal paths 120, 320, 520, and 620 allow for that. This voltage is used in the equations in computing the voltage applied across the load L1. For some systems this may not be needed, as +V may be very stable. Other systems though may have a large variation in +V and so need to factor that variation into the calculations. The sampling of this signal will be dependent upon how quickly +V can change. In many systems this will be a slowly (compared to the speed of driving L1) varying signal and so may be sampled at a rate much slower than the other measured inputs.

The above discussion has centered upon one type of drive and sense:
1) drive of voltage and sense of current. There are three other possibilities:
2) drive of current and sense of voltage,
3) drive of voltage and sense of flux,
4) drive of current and sense of flux,
where flux sensing can be done a number of ways including:
   a) using a sense coil Ls, or
   b) using a Hall effect device. All of these share the common feature of this invention that the information contained in the drive signal does not need to be remeasured by the controller. The controller already knows the drive signal, and therefore can be made simpler than in previous systems.

The following table of system Types summarizes the possibilities:

| Drive | Measured I | dΦ/dt(sense coil) | Φ(Hall sensor) | V |
|---|---|---|---|---|
| I | not usable | 4b | 4a | 2 |
| V | 1 | 3b | 3a | not usable |

Each of the above four systems has advantages in certain situations, which will now be elaborated.

Type 1) drive of voltage and sense of current This is probably the most obvious of the four. In fact many existing controllers drive systems with voltage and monitor the current flow. The common application of this system is the variable reluctance solenoid, where the moving element M1 is a ferromagnetic material and the coil L1 is wrapped around more ferromagnetic material. The gap is typically allowed to close all the way, but sometimes a cushion is inserted into the gap to reduce the hard landing that occurs. Unless the user reduces the current after closure, the efficiency of this system is usually poor. Not only does excessive holding current (which dissipates as heat) hurt efficiency, but the hard landing with the resultant noise and vibration can be a significant loss of energy as well.

This new invention solves these problems. Flux and/or position can be controlled. Controlling the energy put into the system to allow a soft landing (one with little impact at closure) and restricting the energy used while the solenoid is closed to just that necessary to either hold a position or pull with a known flux creates a quiet, efficient system with little vibration and resultant wear.

Figure 8:
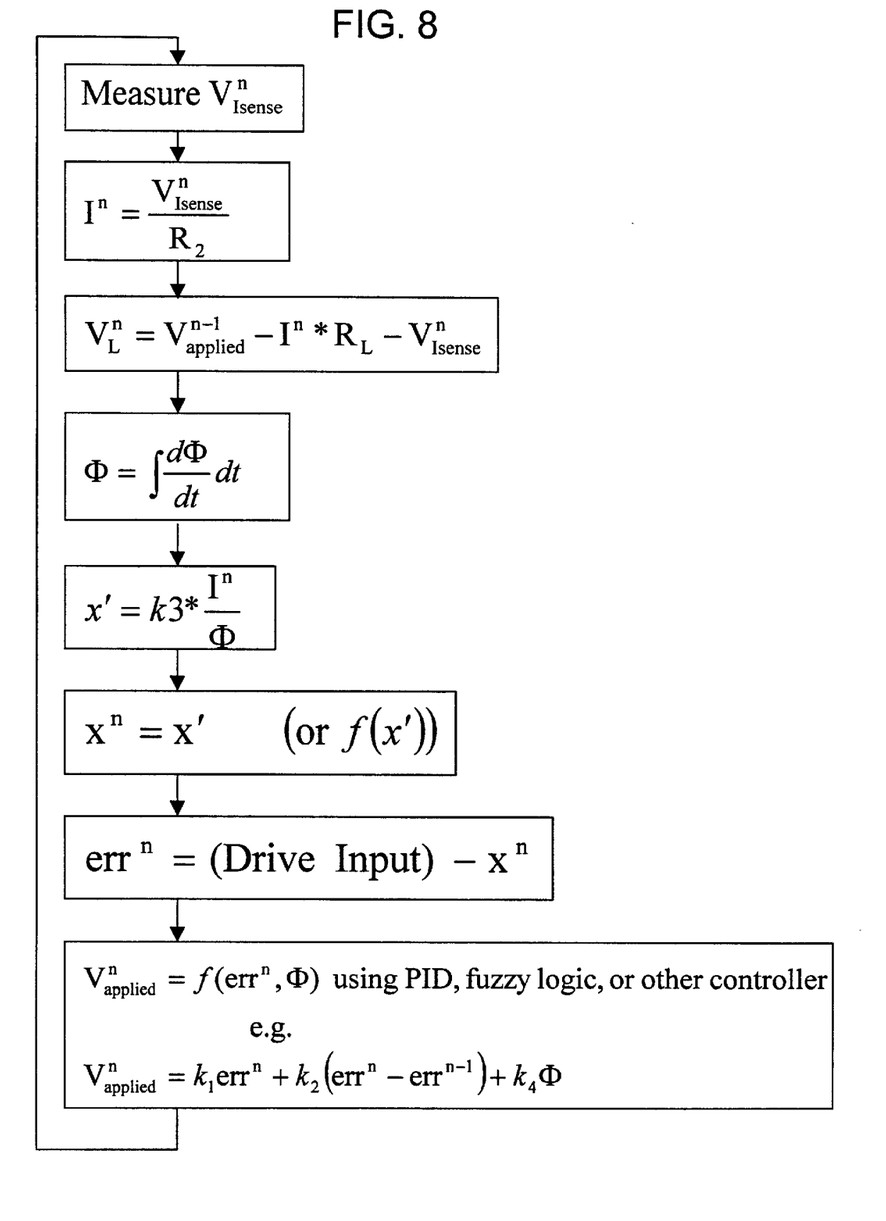
FIG. 8 is a flow chart of the steps necessary for a Type 1 (drive voltage and sense current) controller. This sequence of steps computes the next output (at time n) of a discrete time controller, given the current sensor output, the previous output (time n−1), and the known constants of the system.

In order to arrive at flux or position the user must follow these steps (FIG. 8):

a) Measure I (from $V_{sense}$ and ohms law if the sensor is a simple resistor) $I=V_{sense}/R$ b) Calculate $V_L$ from equation 1.

(Note that for linear amplifier drive systems the value for $V_{applied}$ is known, since it is just the controller output 202 times whatever gain there is in the linear amplifier A1 (FIG. 2). For a PWM system the user also needs to know the power supply voltage along with the duty cycle that the controller uses. If the power supply is not constant or is not known, the controller may be required to measure it, although this measurement may be taken infrequently.)

c) Integrate $V_L$ to arrive at flux (equation 4)

d) from current and flux calculate x' (equation 6)

e) calculate x from x' (equation 7, or if needed, equation 8)

f) calculate an error function (err) that is the difference between the Drive Input 10, and the calculated new position x (or flux Φ if the controller parameter is to be flux). From the flux and position information the controller may then generate an appropriate output, thus closing the feedback loop and causing the system to track the control input.

The controller design can be done using any of the standard closed loop controller design methods in existence. PID (proportional/integral/derivative), fuzzy logic, feedforward, table driven, or more complicated systems can be used to generate the required drive, given the flux Φ and position x signals as inputs. It is recommended that both terms be used in a position controller, since it can be difficult to close the loop using the position X signal alone. A force or flux controller that wishes to apply a constant or varying force signal could consider ignoring the position X signal.

Three examples of a Type 1 system are:

1. A variable reluctance solenoid, such as a relay or contactor.

This type of solenoid often needs the capability of closing without the hard landing that typically occurs. There are numerous patents relating to the construction of such devices containing novel methods of linearizing the force vs. displacement curve, all with the goal of reducing or eliminating the impact at closure. Previous methods of electronic control required an additional sensor to be added to the solenoid. With the technique just described a common two wire solenoid or relay can be retrofitted with a circuit that allows closure under complete control. All that is required is the drive circuit and current sensor, two items that may already be present.

2. An automotive intake or exhaust valve.

Internal combustion engines have intake and exhaust valves that are now controlled with a cam mechanism that synchronizes the valves' openings and closings to the rotation of the other parts of the engine. For many years, the industry has tried to replace this mechanical system with a double-ended electromechanical solenoid. Performance enhancements can be dramatic. Nevertheless, no cars utilizing such valves can be purchased at the current time. In order to open against the pressures that can occur in an engine, the springs in such valves must produce a large amount of force. Consequently, the double acting solenoid must be able to pull with equal (in fact, somewhat greater) force. Without the ability to control the landing speed of these solenoids, attempts to design such valves have failed. Noise and vibration are extremely high. High power consumption due to great inefficiencies is enough to require added generators. The above Type 1 system solves these problems. Although this system acts something like a pendulum (when one solenoid releases the moving element swings across toward the other side), for simplicity each side can be thought of as just a simple variable reluctance solenoid. Closure follows the above method. The landing speed of the solenoid can be chosen to minimize noise, current can be optimized during closure at either end, and no extra hardware is required at the engine other than the two coils themselves. Since only one coil at a time will be energized, the circuit of FIG. 3 might be useful. Given the difficulty and power requirements of this application, and the need for very high efficiency, the circuit of FIG. 5 (or possibly 6) will probably be used along with the "coasting" mode described before. It is possible to combine FIGS. 3 and 5 to slightly reduce the number of components. The arrangement of components is not the important concept here. Any of the figures (1,2,3,4,5,6) could be used. What is important is the application of above technique for calculating flux and position from relatively simple circuits and applying those parameters to the controlled closure of the solenoid.

3. A loudspeaker.

A loudspeaker appears, at least initially, to be quite different from the above example. However, it falls into this same category, with the simplest system being that of driving voltage and measuring current through the moving coil. In this type of system it is the coil that moves and has its position computed rather than a piece of iron or magnet. The equations still apply.

Type 2) drive current and sense voltage

This system is very similar to a Type 1 system, since the same information is available to the controller to compute flux and position. However, there are differences that are useful to note.

Figure 9:
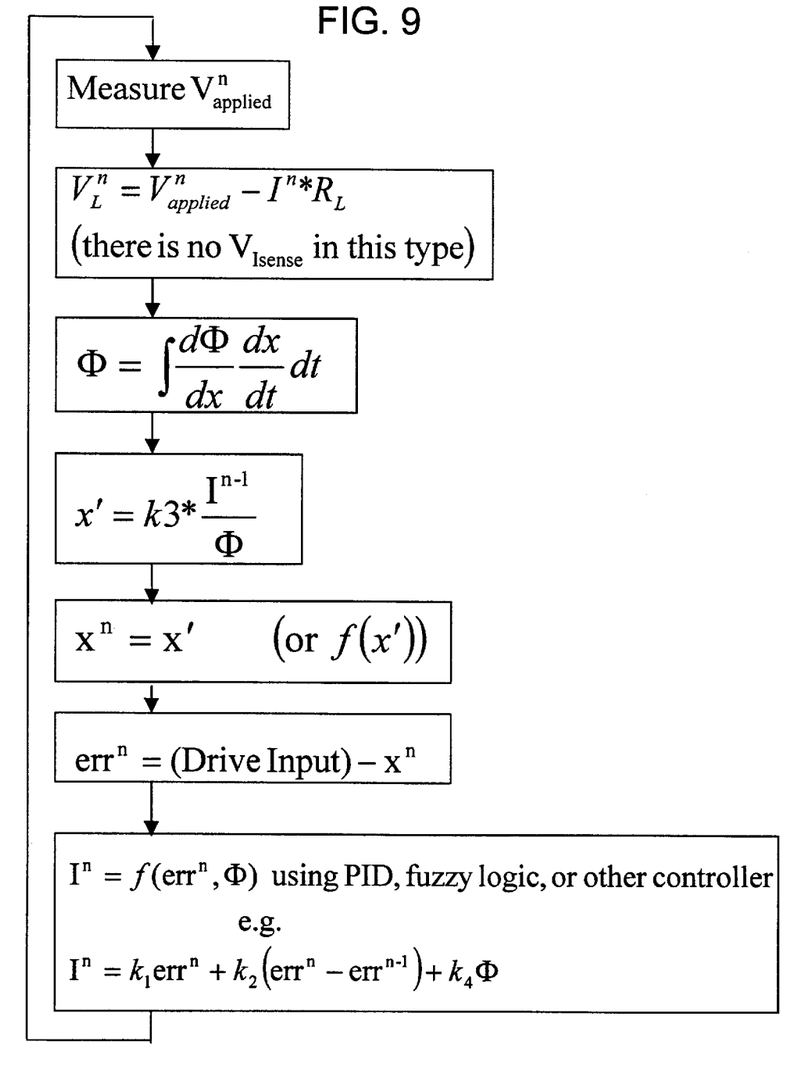
FIG. 9 is a flow chart for a Type 2 (drive current and sense voltage) controller.

This type is a better match for systems that have a moving magnet as part of M1. The moving magnet will create an induced voltage and therefore current in the drive coil, but measuring this induction is probably easier done by sensing voltage than by the current sense technique used in Type 1 systems. The solution proceeds as in Type 1 systems, but in integrating the flux (step c in the Type 1 system) equation 5 must be substituted into equation 4 for the $d\Phi/dt$ term. The calculation of x from x' (step e in the Type 1 system) will probably require the more complex calculation of Equation 8 rather than that of Equation 7. See FIG. 9 for a flow chart.

Type 3) drive voltage and sense flux
Type 4) drive current and sense flux

Both of these are closely related. A number of controllers in the past closed feedback loops around flux while driving the coil with a voltage or current. What was not recognized was that with just this information, complete position control and not just flux control could be achieved. Of course, if only flux (or magnetic force) control is required then the previous designs would suffice. If control or measurement of position is required, then the analysis of this disclosure is needed. The common usage of this type of design would be when the moving element M1 is a magnet, or a combination of a magnet and a ferromagnetic material. The drive coil L1 may be wound around a ferromagnetic material or around another magnet. This type of system does not force a large change in the reluctance of the coil as the moving element moves, but the moving element does create a significant change in flux. See equation 5.

Flux sensing is done here in one of two ways. Either a Hall sensor H1 is used to directly sense the flux, or a sense coil Ls exists that measures the change in flux with time (equation 3 combined with equation 2). The sense coil output needs to be integrated either in hardware or in the controller. See FIG. 7 for a hardware implementation. Integration could also be done in software in a digital controller.

Application of this technique is most common in the levitation of an object. That could be in a magnetic bearing, a Maglev train, or a simple levitating globe novelty item. In large systems such as a train, a Hall effect device might be the preferred sensor to measure the flux in the gap between the train and the "track". Smaller systems, such as the bearing or globe, may use the sense coil approach. This will depend on the magnitude of the flux in the gap, and the physical possibility of inserting a Hall effect device into a suitable location. Hall effect sensors are not nearly as sensitive to low level flux fields as are sense coils, but they are inexpensive and simple. A hanging globe is a one-axis control problem, and although it has been solved before with other methods, this design approach offers a very simple and elegant solution. The Maglev train is a multi-axis (three in rotation, two in motion ignoring travel down the track) control problem that benefits from the simplifications presented here. Simply driving an axis with current or voltage (an off-the-shelf controller will do) and measuring flux with a Hall effect device is enough to stabilize that axis.

Type 4 is the simplest system of all four, since we can proceed immediately to equation 6 and then 7 or 8 to solve for position. No flow chart is given for this simple system, as it is apparent upon consideration of that which has been disclosed herein.

Type 3 is the hardest method of actuation control. Here the user must:

a) measure the flux,
b) determine the change in flux with respect to time, (If a Hall effect sensor is used then its output must be differentiated. If a sense coil and integrator are used then the output of the sense coil can be directly used as this derivative. If high frequency switching is present, the high frequency signal will need to be removed first. If the controller is a digital one, it may be easiest to measure just the flux and compute the derivative.)
c) solve equation 3 for $V_L$, and
d) solve equation 1 for 1.

Figure 10:
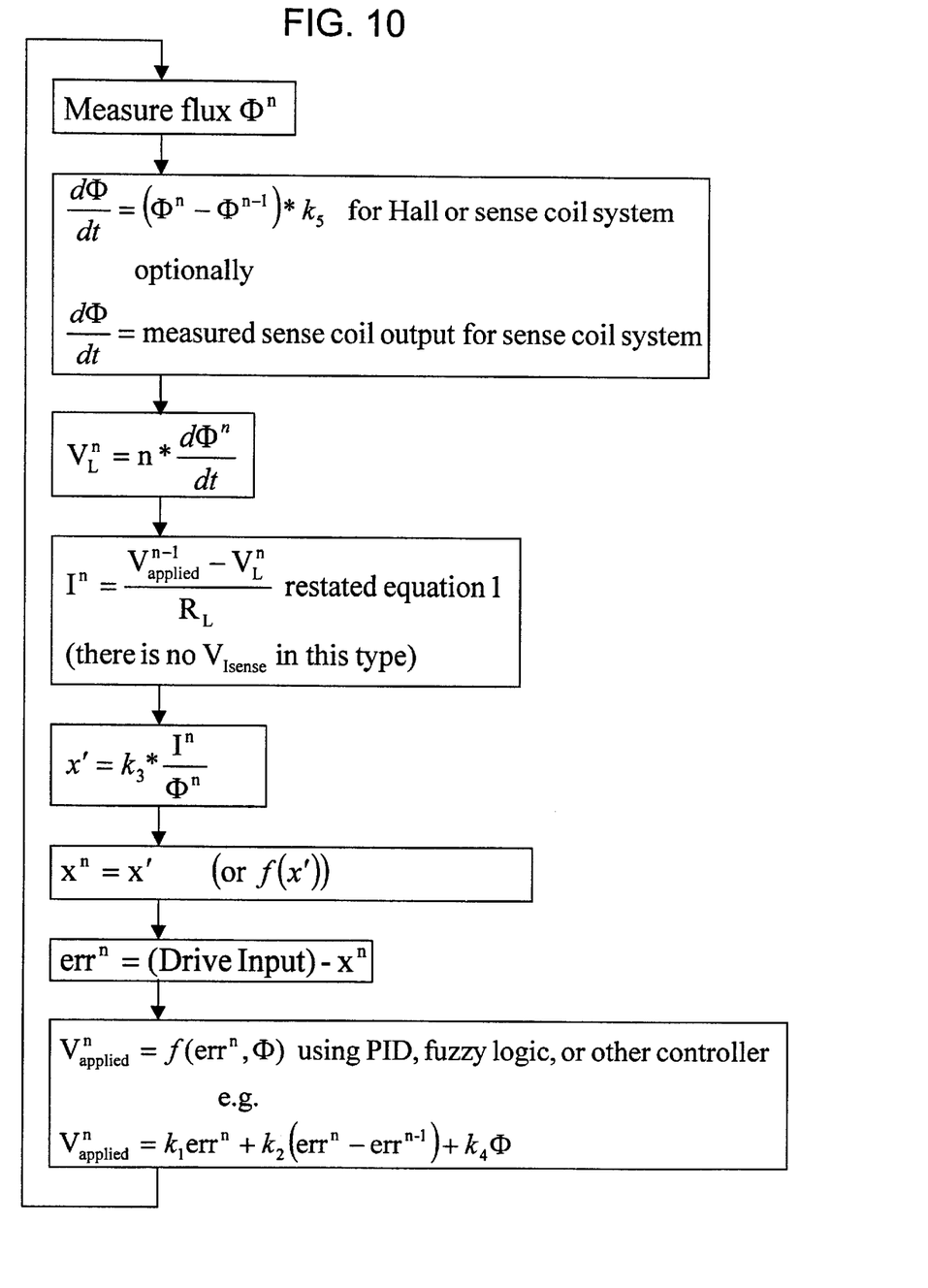
FIG. 10 is a flow chart for a Type 3 (drive voltage and sense flux) controller.

We now have flux and current and can proceed as before. Finally, the discussion of the controller in type 1 above applies just as well here. See the flow chart in FIG. 10.

The derivation for flux $\Phi$ in most of the above requires an integration to compute the value. This calculation is subject to drift, whether it is done numerically in a controller or in a hardware integrator. To stabilize the system against this slow drift term, another term inside the controller might need to be implemented. For some applications, this will not be needed. For example, to soft land a solenoid the integrator could be initialized just before actuation and the drift during the time of control may be quite negligible. But to suspend a train, solenoid, magnetic bearing, or levitated globe for indefinite periods will require compensation of the drift. To accomplish this the controller must add another slow loop that progressively changes an element of the system such as the flux integrator, based upon the average current (or power or voltage) that is applied to the coil. Short term, accurate and stable control is achieved with the previously mentioned controller, while the long term drift is eliminated with this slow cancellation of the drift of the flux integrator.

As a more detailed example, consider a controller of type 1, as described above, driving voltage and sensing current. The induced component of voltage $V_L$ is calculated using equation 1. This calculated induced voltage might have static offsets from a number of sources, e.g., because the true coil resistance might differ from the resistance value R used in evaluating equation 1. The offset in calculated induced voltage, integrated over time, would cause computed flux to ramp gradually up or down in relation to the true flux. Suppose that the servo system is a levitating magnetic bearing, and suppose that just before the controller loop is turned on, the bearing rests on a support, coil current is zero, and consequently magnetic flux is zero. The flux integrator could therefore be initialized correctly to zero, and the servo system could pick the bearing up and bring it quickly to its desired equilibrium location. Before drift would have time to accumulate significantly, the system could sample some measure of the signal level required to levitate at the desired position, x. Suppose, e.g. that this measure of the signal level is the drive voltage level determined by the closed loop (although it could just as well be the measured current in this example.) This signal level would become the target for a slow servo correction, compensating the fast inner loop to stabilize its drift. For example, if the mechanism lifts and levitates a weight below a static electromagnet, the drive level required to hold the weight will be an increasing function of the gap x between the electromagnet and the weight. Suppose that an offset to the flux integrator causes the estimated magnetic flux $\Phi$ to exhibit an increasing positive error; i.e. $\Phi$ in the controller exceeds the true value of $\Phi$. Then from equation 7 (or equation 8 if needed), one sees that the overestimation of flux $\Phi$ in the denominator of the $I/\Phi$ ratio will lead to an underestimation of x' and of x. If the underestimated x is driven to the servo controller set point, than the true x must be above the intended set point, meaning that the magnetic gap will be too large. The symptom of this error will be that the drive voltage applied to the electromagnet to hold up the levitated weight will be higher than the level measured soon after launch, when cumulative drift was negligible. Since a drive voltage above the voltage set point indicates a positive error at the flux integrator output (by assumption, above), one successful drift compensation approach would be to add a signal at the flux integrator input causing its output to be driven negative when the drive voltage is above the set point. The same end could be accomplished by adjusting the estimated coil resistance, RL, used in equation 1. In the long term, the compensation would stabilize the servo against drift. The same compensation, applied too rapidly, could create an unstable feedback loop, since a true drift-free reading of x' below set point would result in an increased drive level, driving x' still lower—a positive feedback situation. One sees that the drift compensation loop must operate in a slower time frame appropriate to nullify drift but not destabilize the response of the servo at higher frequencies.

Of course, the slow correction could be done in a number of places, the flux integrator or resistance RL mentioned above being just convenient ones. Caution must be used since the result can be different from what was intended. If the mass of a levitated object is changed without resetting the correction loop, the target of the levitation could slowly drift to a new location that satisfied the constant average power requirement of this new outer loop. Also if the resistance of the coil RL changes due to temperature changes, then the system can still be stable, but with an offset to the desired target since the calculation in equation 1 will not be done correctly.

In systems that suspend for long periods of time, like the levitated train or globe or bearing mentioned before, the user must choose ahead of time a target for the slow outer loop to track. A wise choice of the target can have positive ramifications. The suspended globe, for example, utilizing permanent magnets in both fixed and moving elements may not have a well defined requirement for the gap x which is to be held constant. Choosing a target that makes the average current delivered to the coil be zero minimizes the energy needed to hold the device suspended. The system will seek out the absolute position x at which this occurs. (In this example that point of average current being zero is when the globe is positioned so that the force of gravity on the moving element exactly equals the static magnetic attraction between the fixed and moving elements.)

The ability to hold a solenoid tightly closed over a long period of time without wasting excessive power is a substantial benefit of the current invention. Typically a system must either far overdrive the solenoid or guess at what current (or power or voltage) level is guaranteed to hold the solenoid closed. This guaranteed level is usually a nominal, pre-calculated value plus a percentage to insure that the solenoid never opens, allowing for manufacturing tolerances and changes over time and temperature. In the system described here, the required level is determined by moving the solenoid to the closed position first. Knowing the actual drive signal necessary to achieve closure eliminates the large uncertainty associated with the nominal value. A smaller percentage could then be added to insure continued closure. The normal control loop could then be replaced with the simpler control loop that just kept the current (or voltage or power) constant. Furthermore, the control system can readily monitor for the current/voltage signature of an unintended loss of latching and respond quickly to re-establish the desired, latched condition, even before an opening motion of the solenoid is readily perceptible.

It should be understood that the preferred embodiment of the present invention as described herein is merely illustrative. Numerous variations and equivalents in design and use of the present invention may be contemplated in view of the following claims without straying from the intended scope and field of the invention disclosed.

I claim:

1. A measurement system for detecting translational position of a moving element of an electrically actuated electromagnetic transducer, said measurement system comprising:

drive means, for setting an electrical drive signal that is applied to a coil of said transducer, said drive signal having a known response to an input signal, and said drive signal causing an electromagnetic actuation force on said moving element;

sense means, for sensing a single electromagnetic parameter of said transducer, wherein said single electromagnetic parameter is responsive to said electromagnetic actuation force and to said position; and computation means, for determining a measure of said position from said drive signal and said single electromagnetic parameter.

2. The system of claim 1, wherein:

said electrical drive signal is a voltage; and, said single electromagnetic parameter is a current.

3. The system of claim 2, wherein:

said drive means includes switching means for generating a pulse width modulated output; and said computation means includes means for computing said electrical drive signal from a duty cycle thereof and a known power supply voltage.

4. The system of claim 2, wherein:

a resistive impedance associated with said transducer and said drive means is known;

said computation means includes means to compute an inductive voltage associated with change in a magnetic flux in said transducer, using said voltage, said current, and said resistive impedance;

said computation means further includes means to integrate said change in said magnetic flux over time to compute a total magnetic flux; and said determining said measure of said position includes computing a ratio of said current and said total magnetic flux.

5. The system of claim 1, wherein:

said electrical drive signal is a voltage; and, said single electromagnetic parameter is a magnetic flux.

6. The system of claim 1, wherein:

said electrical drive signal is a current; and, said single electromagnetic parameter is a voltage.

7. The system of claim 1, wherein:

said electrical drive signal is a current; and said single electromagnetic parameter is a magnetic flux.

8. The system of claim 1, wherein said computation means further includes means for determining, from said electrical drive signal and said single electromagnetic parameter, a measure of electromagnetic force in said transducer.

9. The system of claim 8, further comprising a control system for controlling said position, including:

error signal generation means for comparing a desired controlled position to said measure of said position; and feedback means, using said error signal in setting said measure of electromagnetic force in the setting of said input signal, for causing said position to be driven towards said desired controlled position.

10. The system of claim 9, wherein when said position reaches a position of mechanical contact said control system causes the step of reaching said position of mechanical contact to take place at a controlled impact velocity.

11. The system of claim 9, wherein said control system further includes a closed loop controller associated with said error signal generation means and said feedback means.

12. The system of claim 1, further comprising a control system for controlling said position, including:
   error signal generation means for comparing a desired controlled position to said measure of said position; and
   feedback means, using said error signal in setting said input signal, for causing said position to be driven towards said desired controlled position.

13. The system of claim 12, wherein when said position reaches a position of mechanical contact said control system causes the step of reaching said position of mechanical contact to take place at a controlled impact velocity.

14. The system of claim 1, further comprising:
   an error function, based on proper operation of said system in conjunction with a specific instance of said transducer, said error function describing a departure of a computed parameter of the system from a value of said computed parameter that is consistent with said proper operation; and,
   means for correcting said computed parameter to reduce the magnitude of said error function.

15. The system of claim 14, wherein:
said computed parameter is magnetic flux;
said magnetic flux is computed in the short term from time-integration of an inductive voltage;
said error function indicates drift of said magnetic flux from a correct value, due to error in said time-integration; and,
said means for correcting reduces said error in said time-integration.

16. The system of claim 15 wherein:
said error function is a difference between a desired value of said input signal and the actual value of said input signal as determined by feedback through said system near equilibrium; and,
a multiple of said error function is summed with said inductive voltage at the input for said time-integration.

17. The system of claim 15, wherein:
said error function is a difference between a desired value of said input signal and the actual value of said input signal as determined by feedback through said system near equilibrium; and
said error function is used to correct an estimate of electrical resistance, said estimate being used to estimate said inductive voltage.

18. A system for actuation and control of a mechanical motion in an electromagnetic transducer, said system comprising:
   drive means, responsive in a known way to an input signal by setting an electrical drive signal that is applied to said transducer, causing an electromagnetic actuation force;
   sense means, for sensing a single electromagnetic parameter of said transducer responsive to said electromagnetic actuation force and said mechanical motion;
   computation means for determining, from said electrical drive signal and said single electromagnetic parameter, a measure of said mechanical motion;
   control means, utilizing said measure of said mechanical motion to generate said input signal, for controlling said mechanical motion; an error function, based on proper operation of said system in conjunction with a specific instance of said transducer, said error function describing a departure of a computed parameter of said system from a value of said computed parameter that is consistent with said proper operation; and,
   means for correcting said computed parameter to reduce the magnitude of said error function.

19. The system of claim 18, wherein:
said computed parameter is said magnetic flux;
said magnetic flux is computed in the short term from time-integration of an inductive voltage;
said error function indicates drift of said magnetic flux from a correct value, due to error in said time-integration; and,
said means for correcting reduces said error in said time-integration.

20. The system of claim 19, wherein:
said error function is a difference between a desired value of said input signal and the actual value of said input signal as determined by feedback through said system near equilibrium; and,
a multiple of said error function is summed with said inductive voltage at the input for said time-integration.

21. The system of claim 19, wherein:
said error function is a difference between a desired value of said input signal and the actual value of said input signal as determined by feedback through said system near equilibrium; and
said error function is used to correct an estimate of electrical resistance, said estimate being used to estimate said inductive voltage.

22. A system for actuation and control of a mechanical motion in an electromagnetic transducer, said system comprising:
   drive means, responsive in a known way to an input signal by setting an electrical drive signal that is applied to said transducer, causing an electromagnetic actuation force;
   sense means, for sensing a single electromagnetic parameter of said transducer responsive to said electromagnetic actuation force and said mechanical motion;
   computation means for determining, from said electrical drive signal and said single electromagnetic parameter, a measure of said mechanical motion;
   control means, utilizing said measure of said mechanical motion to generate said input signal, for controlling said mechanical motion;
   a mechanical limit of said mechanical motion;
   detection means, for determining a value of said input signal when said mechanical motion approaches said mechanical limit under approximate force-balance conditions; and,
   latching means, for holding said mechanical motion in the vicinity of said mechanical limit with a fixed said input signal based on said value.

* * * * *